United States Patent Office

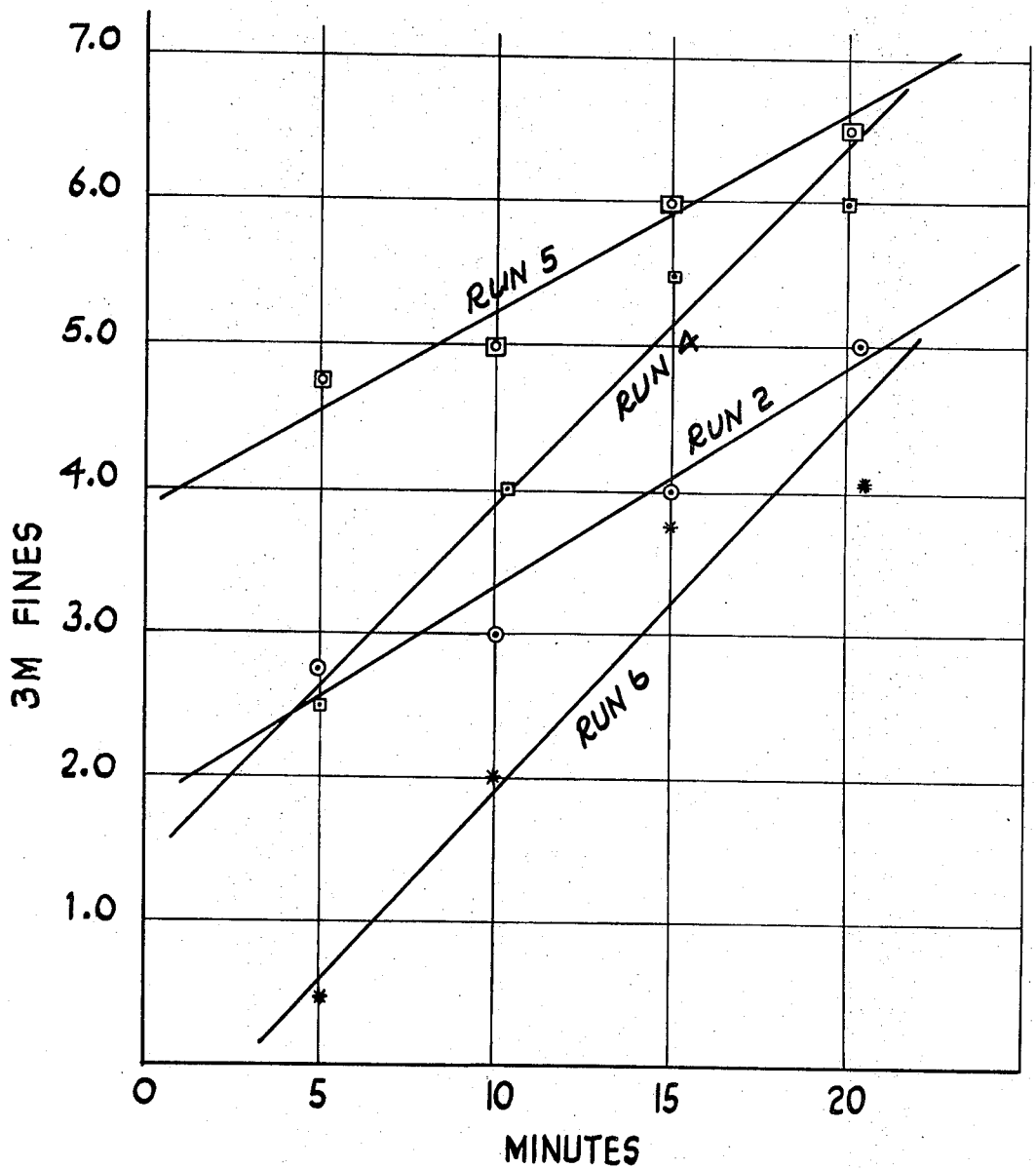

3,531,310
Patented Sept. 29, 1970

3,531,310
PRODUCTION OF IMPROVED METAL OXIDE PIGMENT
Neil C. Goodspeed and Russell R. May, Jr., Wadsworth, and Joseph Ross, Barberton, Ohio, assignors to PPG Industries, Inc., a corporation of Pennsylvania
Filed May 29, 1967, Ser. No. 641,844
Int. Cl. B02c *19/06;* B03b *7/00;* C09c *1/36*
U.S. Cl. 106—300                                             10 Claims

ABSTRACT OF THE DISCLOSURE

The enhancement of the pigmentary properties of inorganic pigments and particularly of pigmentary metal oxides, such as titanium dioxide, is discussed. The incorporation characteristics of such pigments is improved by fluid energy milling with steam, followed by a further fluid energy milling with a substantially liquid-free gas chemically inert to the pigment. The preparation of titanium dioxide is described.

BACKGROUND OF THE INVENTION

In the preparation of inorganic pigments and especially in the preparation of pigmentary metal oxides, such as titanium dioxide, various methods have been developed for enhancing such oxides' pigmentary properties for commercial applications, such as in paints. Included among such methods are calcination, hydroclassification, coating the surface of the pigment with hydrous metal oxides and/or organic coatings, other pigment surface treatments, and milling. A particularly important property for pigments utilized in surface coating compositions is their incorporation, i.e., wetting and dispersion, characteristics. Thus, the ability of a pigment to properly incorporate into a vehicle determines, in part, that pigment's commercial acceptability. For example, the degree to which a pigment is dispersed has a decided influence on many key paint properties. Typical of paint properties affected by the degree of pigment dispersion are surface appearance, texture, color development, floating, flooding, settling, and sagging. Of the aforementioned properties, the surface appearance provides a simple means for evaluating the degree of dispersion because the presence of significant pigment aggregates or flocculates within a surface coating give a rough apearance to the coating. This is especially harmful in the preparation of surface compositions used to produce glossy, smooth coatings, e.g., enamel paints.

The intimate incorporation of a pigment into a paint vehicle by, for example, grinding, can be visualized as occurring in three steps, i.e., wetting, grinding, and dispersion, even though such steps overlap in any actual grind. Wetting refers to the displacement of gases, such as air, or other contaminants, such as water, that are adsorbed on the surface of the pigment particle with subsequent attachment of the wetting medium to the pigment surface. Grinding refers to the mechanical breakup and separation (deagglomeration) of the particle clusters to isolated effective primary particles. Such particles can comprise ultimate or primary particles, i.e., those which cannot be broken down further except by fracture, or a group of ultimate or primary particles that are closely held together and act as a unit working particle, i.e., an effective particle. Dispersion refers to the movement of the wetted particle into the body of the liquid vehicle to effect a permanent particle separation.

The degree to which a pigment is dispersed in a paint vehicle, commonly referred to as "fineness of grind," is routinely measured by the use of a grind gage such as a Hegman gage. The fineness of grind reading is indicative of the largest pigment agglomerates present in the pigment dispersion and in the case of the Hegman gage, is limited to a minimum particle size of about 2 microns. The Hegman gage has a scale ranging from 0 to 8 and many paint specifications, especially high gloss paints, have a minimum fineness of grind specification of 7 (8 being the optimum). Thus, a relatively small increase in the Hegman gage reading at levels near the optimum, e.g., increases of from ¼ to ½, is representative of a significant improvement in the dispersion rating of a pigment.

SUMMARY OF THE INVENTION

This invention relates to the production of improved inorganic pigments, particularly pigmentary metal oxides, and more particularly pigmentary white metal oxides, such as titanium dioxide. In particular, this invention relates to the production of pigments of improved grit, fineness, texture characteristics, and tint efficiency which comprises subjecting the pigment to at least one fluid energy milling with a steam comprising gas or vapor and thereafter to at least one fluid energy milling with a substantially liquid-free gas chemically inert to the pigment.

In a further embodiment of the invention, pigmentary metal oxides, such as titanium dioxide, that have received a coating of at least one hydrous metal oxide are submitted to the two-stage sequential fluid energy milling heretofore described.

In still a further embodiment of the invention, blends of two or more inorganic pigments are subjected to the two-stage sequential fluid energy milling of the presently described process.

DESCRIPTION OF THE DRAWINGS

The attached figure is a plot of Hegman fineness gage readings as a function of mixing time, in minutes, in a paint dispersing apparatus for titanium dioxide pigment fluid energy milled in two stages wth various combinations of steam and nitrogen.

DETAILED DESCRIPTION

The ability of a pigment to incorporate (disperse) in a surface coating composition is an important property of the pigment and has a bearing on the pigment's commercial acceptability. It has now been discovered that this property can be improved by a particular fluid energy milling sequence. This discovery is exemplified hereinafter with pigmentary titanium dioxide but is not limited thereto.

Titanium dioxide pigment is produced commercially by at least two different manufacturing processes. One such process is known as the sulfate or acid process. In the sulfate process, a titaniferous ore, such as ilmenite, is digested in sulfuric acid to form a digest cake. The cake is dissolved in an equeous medium to form a sulfate solution which, after clarification and concentration, is hydrolyzed to precipitate an insoluble titanium dioxide hydrolysate. The hydrolysate is filtered, washed, and eventually calcined at temperatures ranging between 750° C. and 1000° C. Such calcination develops the rutile crystal structure of the titanium dioxide and dehydrates chemically combined water from the pigment.

Another and more recent process for preparing titanium dioxide pigment involves the vapor phase reaction, e.g., oxidation or hydrolysis, of a titanium compound, particularly a titanium tetrahalide at elevated temperautres. In a typical vapor phase oxidation reaction, a titanium tetrahalide, particularly one selected from the group consisting of titanium tetrachloride, titanium tetrabromide, and titanium tetraiodide, is oxidized at temperatures above 500° C., e.g., between 800° C. and 1600° C., with at least a stoichiometric amount of an oxygen-containing gas. The vapor phase oxidation of titanium tetrahalide is described in U.S. Pat. 3,214,284. This patent is incorporated herein by reference in toto to eliminate the need to substantially reproduce a detailed description of such oxidation reaction. The titanium dioxide produced by vapor phase reaction, sometimes called "chloride" pigment, does not generally contain residual soluble salts, such as found in sulfate pigment, and, therefore, does not require an additional washing step to eliminate such salts. In addition, the rutile crystal structure to "chloride" pigment is highly developed during the oxidation or hydrolysis step when rutilizing agents, such as aluminum or zirconium are present, and, therefore, rutilization by calcination is not a required operative step for such pigment.

Titanium dioxide pigment, as well as other pigments, that have not had their surface chemically modified, for example, the deposition of hydrous metal oxides or organic coatings thereon, are commonly referred to as "raw pigment." Examples of raw $TiO_2$ pigment include: calcined sulfate-based titanium dioxide pigment, calcined wet milled sulfate-based titanium dioxide pigment, chloride-based $TiO_2$ pigment, as received from the vapor phase reaction, and degassed chloride-based $TiO_2$ pigment. Such "raw" pigment can, and often is, subjected to a dry milling before further treatment, such as hydroclassification and coating with hydrous metal oxides. This initial dry-fluid energy milling pulverizes gritty or aggregative material existing in the titanium oxide product and provides pigment particles having a more even particle size distribution for coating procedures which typically follow. A hydroclassification typically follows such grinding step in order to eliminate large aggregates and over-sized particles before further treatment. Coating procedures are employed to optimize the essential pigmentary properties of the titanium dioxide pigment and typically involves coating the titanium oxide particles with hydrous oxides of titanium, aluminum, silicon, and other metals such as magnesium, zirconium, tin, zinc, and cerium. A typical coating procedure is described in U.S. Pat. 3,146,119. Such patent is incorporated herein by reference in toto, to eliminate the need to substantially reproduce a detailed description of such coating procedures.

In the case of titanium dioxide pigment, the amount of titania, silica, and alumina hydrates deposited on the surface of the pigment can vary respectively from 0.05 to 10 percent, 0.01 to 10 percent, and 0.05 to 15 percent. Other metal hydrates can be deposited in amounts of from about 0.01 to about 5 percent. The total amount of hydrous metal oxide coating placed on the pigment typically varies from about 2 to about 20 weight percent, based on the weight of the pigment.

One of the steps suggested for developing the pigmentary properties of, for example, uncoated titanium dioxide or hydrous metal oxide coated titanium dioxide particles, has been to dry-fluid energy mill the pigment with air or steam. Such fluid energy milling or dry grinding, as it is commonly known, typically reduces the oil absorption and improves the tinting strength of the pigment. Dry grinding of the coated pigment is usually performed by passing the pigment into a fluid energy mill employing super-heated steam or air as the gaseous fluid supplying the grinding energy. While dry grinding of the coated pigment in accordance with such procedures enhances certain pigmentary properties, it has been found that the development of other properties, such as ease of dispersion in paint vericles, is not fully accomplished.

The failure of a pigment to be successfully dispersed in a vehicle, such as a paint vehicle, will cause the resulting dry coating to have, among other failings, poor texture and gloss. The presence of even a small percentage of coarse agglomerates in the pigment can cause a dispersion problem, i.e., these portions of the pigment fail to properly incorporate into the paint vehicle and can cause commercial rejection of an otherwise acceptable pigment. The percentage of coarse agglomerates causing such a dispersion problem is typically less than 0.1 percent of the pigment.

It has now been found that the dispersion of inorganic pigments, particularly metal oxide pigments and especially pigmentary titanium dioxide, can be improved by subjecting the pigment to a particular sequence of fluid energy milling. In partciular, it has been found that the dispersability of inorganic pigments, such as titanium dioxide pigment, and particularly hydrous metal oxide coated titanium dioxide pigment, in paint vehicles, is improved by subjecting such pigment to at least one fluid energy milling with a steam comprising gas followed by at least one fluid energy milling with a substantially liquid-free gas chemically inert to the pigment. While it is economically preferred that the two different fluid energy millings are conducted in sequence and without intervening process steps, they need not be performed in sequence. Intervening processing steps which alter the subdivision of the pigment should be avoided since such a step may cancel the benefits derived from the first fluid energy milling stages.

A fluid energy type mill is an apparatus in which pigment particles are conveyed by one or more streams produced by jets of milling fluid, such as air or steam, in such a manner to provide particle to particle collisions. For example, in a Micronizer, the jets of milling fluid are placed in a manner which will maintain an inwardly spiraling vortex at a high rotative speed and relatively small inward speed. As a result, the pigment particles conveyed by such milling fluid rub or strike against each other within the apparatus. The milling fluid supplying the grinding energy is withdrawn at an inward point tending to cause the fluid to travel spirally. Smaller particles are carried out with the gaseous fluid, and coarser particles thrown to the periphery where they are subjected to further reduction. Thus, the grinding chamber also serves as an internal classifier.

Examples of fluid energy type mills include: the Micronizer mill, which is described in U.S. Pats. 2,032,827 and 2,219,011, Trost jet mills, Jet-O-Mizers, Reductionizers, Jet Pulverizers, etc. A detailed description of fluid energy type mills including the micronizer, the reductionizer, and the Eagle mill appears in Industrial Engineering Chemistry, volume 38, page 672, et seq., (1946). Fluid energy or jet type mills are also described in Perry's Chemical Engineers Handbook, Third Edition, John H. Perry, Editor, pages 1145–47, McGraw-Hill Book Company, 1950, New York, and Chemical Processing, July, 1966, pages 50–64.

In accordance with the present invention, inorganic pigments such as pigmentary metal oxides, particularly titanium dioxide pigment, are subjected to at least one fluid energy milling with a gaseous fluid comprising steam followed by at least one fluid energy milling with a substantially liquid-free gaseous fluid chemically inert to the pigment. Milling procedures such as wet or dry milling, pulverizing, grinding, fluid energy milling, etc., can be performed prior to the aforementioned sequence of dry-fluid energy milling. Preferably, the pigmentary metal oxide after milling in accordance with this procedure has a moisture content of not more than about 0.5 weight percent, and preferably less than about 0.5 weight percent.

The gaseous fluid comprising steam employed as the energy supplying fluid in the first milling stage is usually super-heated steam to avoid condensation of water on the pigment. Such steam is supplied at pressures of from about 50 to about 350 pounds per square inch gage and at temperatures up to about 600° F. (475–525° F. super heat). Typically, steam at about 150 pounds per square inch gage and about 550° F. total temperature is used. The intensity of fluid energy steam milling can be expressed in terms of pounds of steam to pounds of pigment fed to the mill. Such intensity typically varies from about 0.25:1 to about 100:1, preferably between about 0.5:1 and about 10:1, and usually from about 1:1 to about 3:1. Economically, the lowest possible ratio of steam to pigment that will accomplish the desired milling in the shortest time is used. Pigment feed rates for production sized steam fluid energy mills can range from about 400 pounds per hour up to about 5000 pounds per hour. The exact feed rate will depend on the article size desired and the size capability of the equipment. Laboratory mills will, of course, have smaller capabilities. Steam feed rates will vary in accordance with the above-recited ratios and typically range from about 250 pounds per hour to about 8000 pounds per hour.

The substantially liquid-free gas employed as the energy supplying fluid for milling the pigment in the second stage after the initial milling with the steam comprising fluid is a gas that is chemically inert with respect to the pigment and is non-condensable. By non-condensable is meant that the boiling point of any liquid component of the gas is less than the lowest temperature to which the pigment is likely to encounter during processing and handling subsequent to and during milling. Typically, such temperatures will not be lower than 0° C. Preferably, the gas is substantially anhydrous. By substantially anhydrous is meant that the amount of water vapor present in the gas is such so that the milled pigment does not contain greater than 0.5 weight percent water. Suitable examples of substantially liquid-free, non-condensable gases that can be employed in the second stage milling include: nitrogen, air, carbon dioxide, the noble gases, i.e., helium, argon, krypton, neon, xenon, etc. Typically, unprocessed air from the atmosphere can be used. However, if the humidity of the air is excessive, it should be dried before being used.

The liquid-free, non-condensable gas, such as nitrogen or air, used in the second stage milling step is generally supplied at pressures of from about 50 to about 300 pounds per square inch gage, usually about 100 pounds per square inch gage, and at temeratures of from about 20° C. to about 70° C. or higher. Usually, room temperature is employed. The intensity of milling with the liquid-free gas, as expressed in pounds of non-condensable gas per pound of metal oxide pigment fed to the mill, is in the range of from about 0.25:1 to about 100:1, preferably between about 0.5:1 and about 10:1, and usually from about 1:1 to about 4:1. Here again, economic considerations will dictate the exact ratio of milling fluid to pigment feed. Pigment feed rates in the second stage of anhydrous gas milling will likewise vary depending on the particle size desired and the size of the unit. Feed rates of from about 50 pounds/hour to about 3500 pounds/hour are typical. Non-condensable gas feed rates vary in accordance with the above-recited ratios and typically vary from about 60 cubic feet per minute to about 1000 cubic feet per minute. Pressures for the milling fluid can vary from about 100 p.s.i.g. to about 1000 p.s.i.g. or higher, usually about 350 p.s.i.g.

Additives can be incorporated into pigment subjected to fluid energy milling in order to improve the milling of the pigment. Such additives can be incorporated in either or both milling stages. Particularly useful are organic materials, such as polyols, e.g., glycerol, pentaerythritol, and trimethylolpropane; fatty acids, e.g., oleic, and stearic acid; trialkanolamines, e.g., triethanolamine; etc. The amount of such additives incorporated during milling or added to the pigment before milling can very widely but typically will range between about .05 and about 5 weight percent, based on the amount of pigment.

Fluid energy milling is attrition milling of the pigment by means of an appropriate gaseous fluid and is, therefore, distinguishable from other types of milling, e.g., such as impact milling, sand milling, or micro-pulverizing. Dry-fluid energy milling is to be distinguished from wet milling wherein fluid in a liquid form as distinguished from a gaseous or vaporous form, is utilized with a particulate pigment.

The ease and degree of dispersion of titanium dioixde pigment can be measured by the Cowles dispersion test which is described in A.S.T.M. Test Method D–1210–54.

Another method for evaluating dispersion can be performed by the use of a conventional malted milk mixer (3M Test). In this test, and as performed in the subsequently described examples, a vehicle such as linseed oil and mineral spirits is placed in a metal canister affixed to the mixer and the test pigment, such as titanium dioxide, added thereto. The mixer is then operated at low speed for five minutes. A sample is removed and a Hegman fineness measurement made. The mixer is started again and samples taken at three more five-minute intervals so that Hegman fineness measurements are obtained at 5, 10, 15, and 20 minutes of mixing.

The tint efficiency of a pigment can be determined by the reflectometry method disclosed on pages 704 to 715, volume 34, of the Journal of Paint Technology and Engineering, (Official Digest), July 1962.

The fluid energy milling process of the present invention is applicable to the production of inorganic pigments. Particularly, this process is applicable to pigmentary metal oxides such as titanium dioxide (anatase or rutile), as well as other metal oxides, such as the oxides of aluminum, arsenic, iron, chromium, silicon, strontium, tin, zinc, zirconium, antimony, lead, and mercury. In addition, the present process is applicable to other inorganic pigments such as zinc sulfide, cadmium sulfide, iron sulfide, magnesium silicate, chromates, and carbon blacks. Moreover, the present invention is applicable to blends of inorganic pigments. Examples of typical blends or composites include: titanium dioxide-zinc oxide and titanium dioxide-silica. Blends of two or more pigments are also contemplated.

The pigments subjected to fluid energy milling by the above-described process can be utilized as pigments in the preparation of surface coating compositions in combination with conventional vehicle systems comprising a film former or binder and dispersion medium. Of particular utility for titanium dioxide is its use as a pigment in paints, paper, plastics, and printing inks.

The present process is more particularly described in the following examples which are intended as illustrative only since numerous modifications and variations therein will be apparent to those skilled in the art.

Example I

Titanium tetrachloride, in an amount of about 34 gram moles per minute, was oxidized in the vapor phase in a suitable reactor with about 45 gram moles per minute of oxygen. The vapor phase reaction was carried out in the presence of silicon tetrachloride and aluminum chloride in amounts that provided about 0.5 weight percent silica and about 1.8 weight percent alumina on the titanium dioxide produced.

The titanium dioxide thus produced was coated in a procedure similar to that described in U.S. Pat. 3,146,119 so as to provide a coating of about 0.7 weight percent hydrous titania ($TiO_2$) and about 1.2 weight percent hydrous alumina ($Al_2O_3$) on the pigment. The coated pigment was dried and portions of the dried pigment were fluid energy milled in a Fay 12-inch Micronizer utilizing steam, nitrogen, and combinations thereof as the milling fluid. The pigment feed rate to the micronizer was about 8 to 10 pounds per minute. Steam temperature, pressure, and feed rate, were respectively about 430° F., 150 pounds per square inch gage, and about 8 to 10 pounds per minute; nitrogen temperature, pressure, and feed rate were respectively about 70° F., about 175 pounds per square inch gage, and about 8 to 10 pounds per minute. After each portion of the pigment was micronized, the pigment was tested for fineness of grinding by the 3M Test, heretofore described. The results of these tests are tabulated in Table I.

TABLE I

| Run | Grind media | | 3M Fines | | | |
|---|---|---|---|---|---|---|
| | First pass | Second pass | 5 min. | 10 min. | 15 min. | 20 min. |
| 1 | Steam | None | 3.75 | 4.0 | 4.5 | 5.0 |
| 2 | do | Steam | 2.75 | 3.0 | 4.0 | 5.0 |
| 3 | Nitrogen | None | 3.5 | 4.5 | 4.5 | 5.5 |
| 4 | do | Nitrogen | 2.5 | 4.0 | 5.5 | 5.0 |
| 5 | Steam | do | 4.75 | 5.0 | 6.0 | 6.5 |
| 6 | Nitrogen | Steam | 0.5 | 2.0 | 3.75 | 4.0 |

The data in Table I show that fluid energy milling with steam followed by nitrogen milling (Run 5) produced a product that had a better fineness of grind than products produced by single passes of steam or nitrogen (Runs 1 and 3), double passes with steam or nitrogen (Runs 2 and 4), than other combinations. Portions of this data are plotted in the attached figure, which graphically illustrates that the combination of steam milling followed by nitrogen milling yields a product of increased fineness of grind.

Example II

Example I is repeated except that air and carbon dioxide are substituted in turn for nitrogen as the fluid energy milling fluid in Runs 3, 4, 5, and 6. Fineness of grind measurements by the 3M Test show that steam-carbon dioxide and steam-air milling combinations yield a product of improved fineness of grind than sequential carbon dioxide-steam and air-steam millings, double stage milling with carbon dioxide or air, and single stage milling with steam, carbon dioxide, or air.

Example III

Titanium dioxide prepared and coated with hydrous titania and alumina in a manner analogous to Example I was micronized with steam having a temperature of about 430° F. and a pressure of about 150 p.s.i.g. A portion of the pigment was incorporated into a paint vehicle; the paint fines were measured by means of a Hegman gage and found to be 3. The tint efficiency of this pigment was measured and found to be 91 percent. Another portion of the steam-milled pigment was fluid energy milled twice with nitrogen in a Trost Mill having an ambient temperature, i.e., about 70° F. Pusher and opposing jet pressures were respectively about 240 and 220 p.s.i.g. This pigment was incorporated into a second equal quantity of the same paint vehicle. The paint fines of the steam-nitrogen milled pigment were measured and found to be 7 Hegman. The tint efficiency was found to be 95 percent.

A repeat of the above-described procedure increased the Hegman paint fines from a value of 2 to 7¾ and the tint efficiency from 89 to 96 percent.

Example IV

Titanium dioxide prepared and coated in a manner analogous to Example I was steam micronized with steam at a temperature of about 430° F. and a pressure of 150 p.s.i.g. A paint prepared with this pigment had a paint fines measurement of 4 on the Hegman gage and a tint efficiency of 95 percent. A portion of the steam milled pigment was double milled with carbon dioxide at ambient temperature in a Trost Mill at a pusher jet pressure of about 240 p.s.i.g. and an opposing jet pressure of about 220 p.s.i.g. This $CO_2$ milled pigment was incorporated into a second equal quantity of the same paint vehicle as used for the steam micronized pigment. The paint fines were measured and found to be 7¾ Hegman and to have a tint efficiency of 99 percent. Another portion of this pigment was fluid energy milled with ambient nitrogen and pusher and opposing jet pressures respectively of 240 and 220 p.s.i.g. and the paint fines measured and found to be 7¾ Hegman.

Example V

Titanium dioxide pigment prepared and coated in a manner analogous to that described in Example I was fluid energy milled in a 20-inch micronizer with steam having a temperature of 470° F. at a grind pressure of 155 p.s.i.g. The steam rate was about 950 pounds per hour and the titanium dioxide feed rate was from 7 to 12 pounds per minute. The titanium dioxide product from the 20-inch micronizer was tested for dispersion by means of the Cowles dispersion test. After ten minutes in the paint vehicle, the pigment tested from 6 to 7½ on a Hegman gage. The 20-inch steam micronized titanium dioxide was fed to a T-15 Trost mill and fluid energy milled with nitrogen having a temperature of from 125 to 135° F. The nitrogen feed rate was approximately 480 pounds per hour and was introduced at about 210 p.s.i.g. The $TiO_2$ feed rate was about 120 pounds per hour and was introduced at a feed pressure of about 225-240 p.s.i.g. The Hegman gage results after ten minutes milling in the Cowles dispersion test for the nitrogen milled pigment was 7¾. This data illustrates that the dispersion of titanium dioxide pigment was significantly improved by fluid energy milling the pigment with nitrogen after a preceding fluid energy milling with steam.

Example VI

The fluid energy milling procedure described in the the present specification and as illustrated in the preceding examples is utilized in the fluid energy milling of zinc oxide, antimony oxide, silicon dioxide, and zinc sulfide pigments. Improvements in dispersion of these pigments is realized by the use of the above-described procedure of steam followed by a substantially non-condensable, liquid-free gas fluid energy milling. A blend of 85 weight percent titanium dioxide and 15 weight percent silica is also submitted to the above-described milling procedure and the dispersion property of the blend is similarly improved.

While there are above described a number of specific embodiments of the present invention, it is obviously possible to produce other embodiments and various equivalent modifications thereof without departing from the spirit of the invention.

Having set forth the general nature and specific embodiments of the present invention, the true scope is now particularly pointed out in the appended claims.

What is claimed is:

1. In a process for fluid energy milling substantially dry pigmentary titanium dioxide, the improvement which comprises subjecting the pigment to at least one fluid energy milling with a gaseous fluid comprising steam and thereafter to at least one fluid energy milling with a substantially liquid-free, non-condensible gas chemically inert to the pigment, said liquid-free gas having a temperature of from about 20° C. to about 70° C.

2. A process according to claim 1 wherein the titanium dioxide fluid energy milled has a coating of at least one hydrous metal oxide.

3. A process for improving the incorporation properties of pigmentary titanium dioxide, which comprises, in combination, the steps of fluid energy milling substantially dry titanium dioxide at least once with steam, and then fluid energy milling the pigment at least once with a substantially liquid-free, non-condensible gas chemically inert to the metal oxide, said liquid-free gas having a temperature of from about 20° C. to about 70° C.

4. A process according to claim 3 wherein the titanium dioxide fluid energy milled has a coating of at least one hydrous metal oxide.

5. A process according to claim 3 wherein the titanium dioxide fluid energy milled has a coating of at least one hydrous metal oxide selected from the group consisting of aluminum, titanium and silicon hydrates.

6. A process according to claim 3 wherein the titanium dioxide is fluid energy milled with steam followed by a fluid energy milling with at least one member selected from the group consisting of nitrogen, air and carbon dioxide.

7. In a process of producing pigmentary titanium dioxide wherein titanium tetrahalide is oxidized in the vapor phase with an oxygen-containing gas at elevated temperatures and the titanium dioxide pigment thus produced is coated with at least one hydrous metal oxide, dried and the dried pigment fluid energy milled, the improvement which comprises fluid energy milling the dried pigment at least once with a gaseous fluid comprising steam and sequentially thereafter fluid energy milling the steam milled pigment at least once with a substantially liquid-free, non-condensible gas chemically inert to the pigment, said liquid-free gas having a temperature of from 20° C. to about 70° C.

8. A process according to claim 1 wherein the liquid-free gas is selected from the group consisting of air, nitrogen, and carbon dioxide.

9. A process according to claim 1 wherein the moisture content of the pigment after fluid energy milling is not more than about 0.5 weight percent.

10. A process according to claim 7 wherein the pigment is first milled with steam and then milled with at least one member selected from the group consisting of air, nitrogen, and carbon dioxide.

References Cited

UNITED STATES PATENTS

| 2,846,151 | 8/1958 | Wehn et al. | 241—39 XR |
|---|---|---|---|
| 3,178,121 | 4/1965 | Wallace | 241—5 |
| 3,317,145 | 5/1967 | Stephanoff | 241—5 |
| 3,380,665 | 4/1968 | Jester et al. | 241—29 XR |
| 3,412,944 | 11/1968 | Wollenberg | 106—300 XR |

HELEN M. McCARTHY, Primary Examiner

H. M. S. SNEED, Assistant Examiner

U.S. Cl. X.R.

106—308; 241—2, 29